(12) United States Patent
Hartwell et al.

(10) Patent No.: US 7,509,352 B1
(45) Date of Patent: Mar. 24, 2009

(54) METHOD AND APPARATUS FOR RECORD SYNCHRONIZATION WITH CONFLICT RESOLUTION

(75) Inventors: Aaron J. Hartwell, Duvall, WA (US);
Brian Trenbeath, Redmond, WA (US);
David Raissipour, Issaquah, WA (US);
Ronald Eric Gray, Redmond, WA (US);
Kendall D. Keil, Bothell, WA (US);
Stephen T. Wells, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 10/610,268

(22) Filed: Jun. 30, 2003

(51) Int. Cl.
*G06F 12/00* (2006.01)
*G06F 17/30* (2006.01)

(52) U.S. Cl. ...................... 707/203; 707/200
(58) Field of Classification Search ............ 707/10, 707/200; 709/248, 236; 715/500.1
See application file for complete search history.

(56) References Cited

U.S. PATENT DOCUMENTS

| | | | |
|---|---|---|---|
| 5,729,735 A * | 3/1998 | Meyering ............... | 707/10 |
| 5,758,355 A * | 5/1998 | Buchanan .............. | 707/201 |
| 5,787,247 A | 7/1998 | Norin et al. ............ | 395/200.5 |
| 5,897,640 A | 4/1999 | Veghte et al. ........... | 707/202 |
| 5,974,238 A * | 10/1999 | Chase, Jr. .............. | 709/248 |
| 6,052,735 A * | 4/2000 | Ulrich et al. ........... | 709/236 |
| 6,125,369 A | 9/2000 | Wu et al. ............... | 707/201 |
| 6,202,085 B1 | 3/2001 | Benson et al. .......... | 709/205 |
| 6,324,544 B1 * | 11/2001 | Alam et al. ............ | 707/201 |
| 6,330,568 B1 * | 12/2001 | Boothby et al. ........ | 707/201 |
| 6,463,427 B1 | 10/2002 | Wu ...................... | 707/3 |
| 6,505,214 B1 | 1/2003 | Sherman et al. ........ | 707/201 |
| 6,516,327 B1 * | 2/2003 | Zondervan et al. ..... | 707/200 |
| 6,529,921 B1 * | 3/2003 | Berkowitz et al. ..... | 715/500.1 |
| 6,560,655 B1 * | 5/2003 | Grambihler et al. .... | 709/248 |
| 6,941,326 B2 * | 9/2005 | Kadyk et al. ........... | 707/202 |
| 6,973,472 B2 * | 12/2005 | Chiu .................... | 709/200 |
| 2004/0260715 A1 * | 12/2004 | Mongeon et al. ....... | 707/101 |

OTHER PUBLICATIONS

Gallersdorfer, Rainer; Klabunde, Karin; Nellesen, Ralf, "An Improved Method For Consistent Replicated Data In The Intelligent Network," IEEE Symposium Record On Network Operations and Management Symposium, v.I, 1994, p. 244-256.*

(Continued)

*Primary Examiner*—Tony Mahmoudi
*Assistant Examiner*—Paul Kim
(74) *Attorney, Agent, or Firm*—Merchant & Gould

(57) ABSTRACT

A method and apparatus are provided for synchronizing records stored at a first computer with records stored at a second computer. If properties of the first record have been modified, a determination is made as to whether all of the modified properties may be ignored. If all of the properties are not ignorable, a determination is made as to whether the values of all non-ignorable properties are identical between the first and second records. If the values are identical, the modifications to the properties of the first record are discarded. If the values are not identical, a determination is made as to whether the modified properties are decidable. If the properties are decidable, a value is selected from either the value stored in the first record or the second record, and utilized as the selected value of the modified property for the first and second records.

14 Claims, 7 Drawing Sheets

OTHER PUBLICATIONS

Singhal, Mukesh, "Update Transport: A New Technique For Update Synchronization in Replicated Database Systems," IEEE Transactions On Software Engineering, v. I 6, No. 1 Dec. 2, 1990, p. 1325-1336.*

Sarin, Sunil K., Kaufman, Charles W.; Somers, Janet E., "Using History Information To Process Delayed Database Updates," Twelfth International Conference On Very Large Data Bases, Proceedings (VLDB '86.), Kyoto, Japan, 1986, p. 71-78.*

Palazzo, S.; Puliafito, A.; Scarpa, M., "Design and Evaluation of A Replicated Database for Mobile Systems" Wireless Networks, v. 6, n. 2, 2000, p. 131-144.*

Ceri, S.; Houtsma, M.A.W.; Keller, A.M.; Samarati, P., "Independent Updates and Incremental Agreement In Replicated Databases," Distributed and Parallel Databases, v. 3, n. 3 Jul. 1995, p. 225-246.*

Palazzo, S.; Puliafito, A.; Scarpa, M., "Design and Evaluation of A Replicated Database for Mobile Systems," *Wireless Networks*, v. 6, n. 2, 2000, p. 131-144.

Holliday, Joanne; Steinke, Robert; Agrawal, Divyakant; El Abbadi, Amr, "Epidemic Quorums For Managing Replicated Data," IEEE International Performance, Computing, and Communications Conference (IPCCC 2000); *IEEE International Performance, Computing and Communications Conference, Proceedings 2000*, Phoenix, AZ, 2000, p. 93-100.

Ceri, S.; Houtsma, M.A.W.; Keller, A.M.; Samarati, P., "Independent Updates and Incremental Agreement In Replicated Databases," *Distributed and Parallel Databases*, v. 3, n. 3, Jul. 1995, p. 225-246.

Gallersdorfer, Rainer; Klabunde, Karin; Nellessen, Ralf, "An Improved Method For Consistent Replicated Data In The Intelligent Network," *IEEE Symposium Record On Network Operations and Management Symposium*, v. 1, 1994, p. 244-256.

Singhal, Mukesh, "Update Transport: A New Technique For Update Synchronization In Replicated Database Systems," *IEEE Transactions On Software Engineering*, v. 16, No. 12, Dec. 1990, p. 1325-1336.

Sarin, Sunil K.; Lynch, Nancy A., "Discarding Obsolete Information In A Replicated Database System," *IEEE Transactions on Software Engineering*, v. SE-13, n. 1, Jan. 1987, p. 39-47.

Sarin, Sunil K., Kaufman, Charles W.; Somers, Janet E., "Using History Information To Process Delayed Database Updates," *Twelfth International Conference On Very Large Data Bases, Proceedings (VLDB '86)*, Kyoto, Japan, 1986, p. 71-78.

* cited by examiner

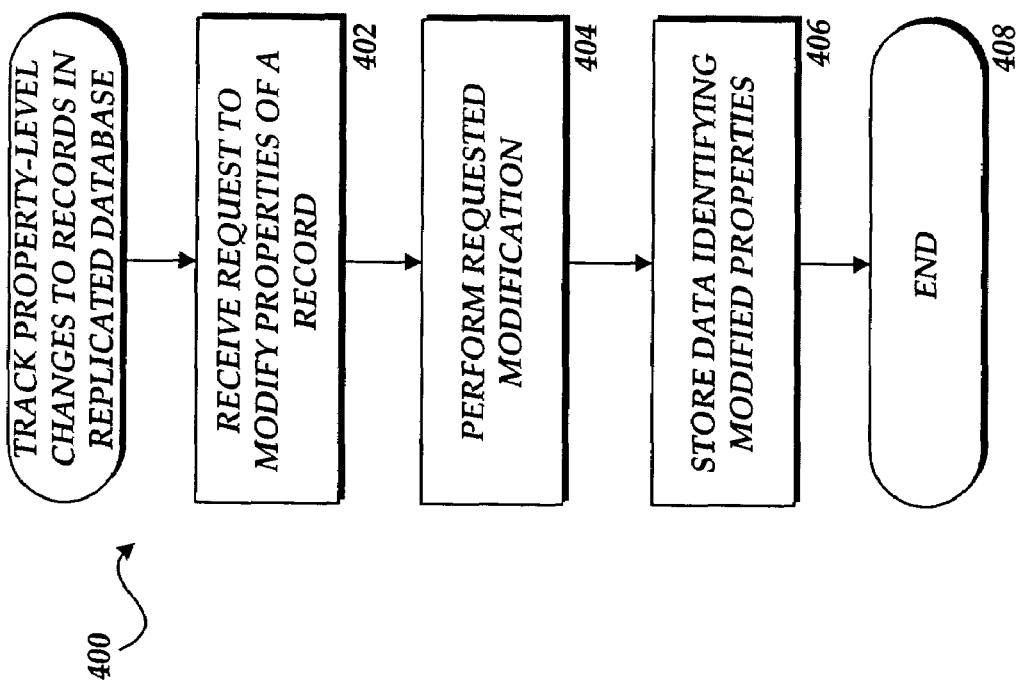

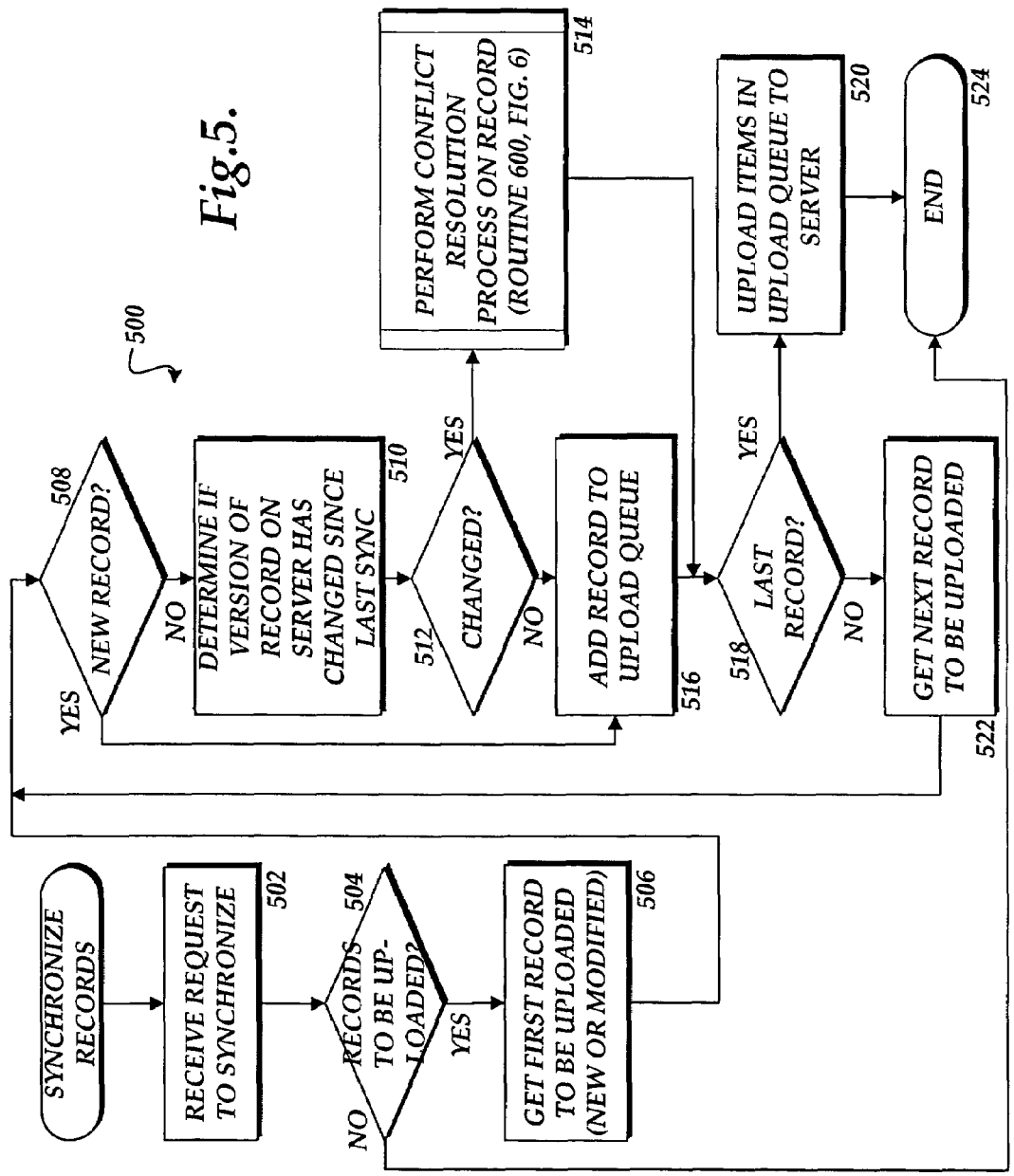

METHOD AND APPARATUS FOR RECORD SYNCHRONIZATION WITH CONFLICT RESOLUTION

TECHNICAL FIELD

The invention generally relates to the field of record synchronization and, more specifically, to the field of resolving conflicts between records during record synchronization.

BACKGROUND OF THE INVENTION

In addition to utilizing a desktop computer, today's high technology workers often carry a personal digital assistant ("PDA"), a laptop computer, a wireless telephone and possibly other devices. In many cases, each of these devices is capable of performing personal information manager ("PIM") functions in a manner similar to those performed by desktop computers. As a result, the PIM databases stored in these devices are typically synchronized with a database stored at a server computer. In this manner, the database stored in each of the devices can contain a user's current PIM data, such as electronic mail ("e-mail") messages, contact information, calendar data, task lists, notes, and other information.

When a PIM record is modified independently on both the server computer and a device, such as a laptop computer, a conflict may arise when the device is synchronized with the server computer. The conflict arises because the contents of one or more records stored on the server computer differ from the contents of the corresponding records stored on the device. For instance, a user may utilize a desktop computer that is connected to a network continuously in conjunction with a laptop computer that is only periodically connected to the network for synchronization. In this scenario, the user may work on the laptop computer and be presented with a reminder for a meeting. The user may dismiss the reminder and continue to work offline from the server computer. Later, the user may see the same reminder again on the desktop computer and again dismiss the reminder. When the user subsequently synchronizes the laptop computer with the server computer, the server computer will detect that the item is in conflict. The conflict arises because changes were made to different versions of the record independently of one another. Therefore, the records stored on the server computer and the laptop computer may be different or may be changed in the same way in both places.

In many cases, when a synchronization conflict arises, a user is presented with a message indicating that a conflict has arisen. The user will also be asked to assist in the resolution of the conflict. This typically requires a user to review the conflicting records and to select one of the records as the correct record. This process can be confusing and time consuming for a user. Moreover, it can be especially frustrating for a user when a "spurious" conflict is generated as the result of duplicate edits on different versions of a record. For instance, this may occur when the same changes have been made to the server and laptop versions of the records. In such a situation, the records are not truly in conflict.

Although requiring a user to manually resolve conflicts can be annoying to a user and tend to decrease productivity, previous software solutions have been unable to meaningfully resolve conflicts without user intervention. One of the main reasons it has been difficult to resolve conflicts without user intervention is that changes to PIM records have typically been tracked only on a per record basis. For instance, in previous PIM client and server applications, it was only possible to detect that a record had been changed. It was not possible to detect the particular fields, or properties, of a record that had been modified. Accordingly, it has previously been difficult, if not impossible, to automatically resolve most types of synchronization conflicts.

It is with respect to these considerations and other that the various embodiments of the present invention have been made.

SUMMARY OF THE INVENTION

In accordance with the present invention, the above and other problems are solved by methods and apparatus for record synchronization with conflict resolution. The methods and apparatus provided herein track changes to a PIM database stored on a device on a per property basis. When the PIM database stored on the device is synchronized with a PIM database stored on a server computer, potential conflicts between records stored in the PIM database on the device and the PIM database stored on the server computer are identified. Once the potential conflicting records have been identified, the changed properties in the records stored in the PIM database of the device are examined to determine if the conflict may be resolved without user intervention. If the conflicts may be resolved without user intervention, the conflict is resolved without requiring the user to participate in the conflict resolution process.

In accordance with other aspects, the present invention relates to a method for record synchronization with conflict resolution. According to this method, a request is received to synchronize a PIM database contained on a device with a PIM database located at a server computer. In response to the request, the records contained in the PIM database located on the device that are to be transmitted to the server computer are identified. A determination is made as to whether any of the identified records are new records that have not been previously transmitted to the server computer.

For each of the records that are going to be transmitted to the server computer and that are not new, a determination is made as to whether the transmittal of the records to the server computer will generate a synchronization conflict. Each record that may generate a conflict with records stored at the server computer is processed through a conflict resolution process. Once the conflict resolution process has been completed, items for which synchronization conflicts could be resolved without user intervention are utilized to update the corresponding record at the server computer. Items for which the conflict could not be resolved without user intervention are presented to a user for assistance in resolving the conflict.

The conflict resolution process utilizes tracked changes to the properties of records stored at the device to resolve conflicts without the interaction of a user. In particular, some properties within records are considered "ignorable." Ignorable properties comprise meta-data properties of a record that have no value to a user and which can therefore be considered ignorable for conflict resolution purposes. One example of such a property would be the last modified time/date stamp that is frequently written on record replicas.

Some record properties can also be considered "decidable" without the participation of a user. Decidable properties are those properties that may be directly edited by user actions, cannot be considered ignorable, yet can be set by a client computer configured to resolve synchronization conflicts without user interaction. For example, one decidable property is the read state of an e-mail message. If a client device finds that the read state is in conflict on two versions of a given e-mail message, the device could set the read state as unread.

The worst case would be that the user re-reads the message. These types of properties, therefore, can be considered as decidable by a device when synchronizing a PIM database with a database stored at a server computer without the risk of data loss.

When the conflict resolution engine is executed for each record, a determination is first made as to whether any non-decidable or non-ignorable properties have been changed on the record. If all of the properties of a modified record are ignorable, one version of the record can be chosen and utilized. If the changed properties are not all decidable or ignorable, the values for the same set of properties is retrieved from the PIM database stored on the server computer. For each property that is not ignorable, the value retrieved from the server and the value stored on the device are compared. For each difference that is detected, a determination is made as to whether the property is client decidable. If the property is decidable, the two values are examined and the appropriate value is selected. The appropriate value is then propagated to the PIM database stored at the server computer. If the property is not client decidable, a synchronization conflict is generated and a user is required to participate in the conflict resolution process.

In accordance with still other aspects, a method is provided for synchronizing a first record stored at a first computer with a corresponding second record stored at a second computer. The first and second records include one or more properties. According to the method, a determination is made as to whether one or more of the properties of the first and second records have been modified. If one or more of the properties of the first and second records have been modified, a determination is made as to whether all of the modified properties of the first record are properties that can be ignored during synchronization. If each of the properties of the first record are properties that can be ignored, the modifications to the properties are discarded.

If the modified properties of the first record are not properties that can be ignored during synchronization, each of the modified properties that cannot be ignored are identified. For each of the modified properties that cannot be ignored, a determination is made as to whether of the value of the modified property stored in the first record is different than the value of the modified properties stored in the second record. If the values are not different between the first and second records, the modifications to the properties of the first record are discarded. Such is the case when the same property on two different records have been modified in the same fashion.

If the value of the modified property stored in the first record is different than the value of the modified properties stored in the second record, a determination is made as to whether the modified property is a property that is decidable. If the property is decidable, a value is selected from either the value of the modified property stored in the first record or the value of the modified property stored in the second record. Alternatively, if the modified properties are mutually exclusive, the properties may be merged so that no data is lost and no conflict is generated. The selected value is then utilized as the value of the modified property for both the first and the second record. If the modified property is not a property that is decidable, a synchronization conflict is generated for the first and second records.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE DRAWINGS

FIG. 4 is a flow diagram illustrating a routine for tracking property level changes to records in a replicated database in one embodiment of the invention;

FIG. 5 is a flow diagram showing an illustrative routine for synchronizing database records between a client computer and a server computer according to one embodiment of the invention.

DETAILED DESCRIPTION OF THE INVENTION

Figure 1:
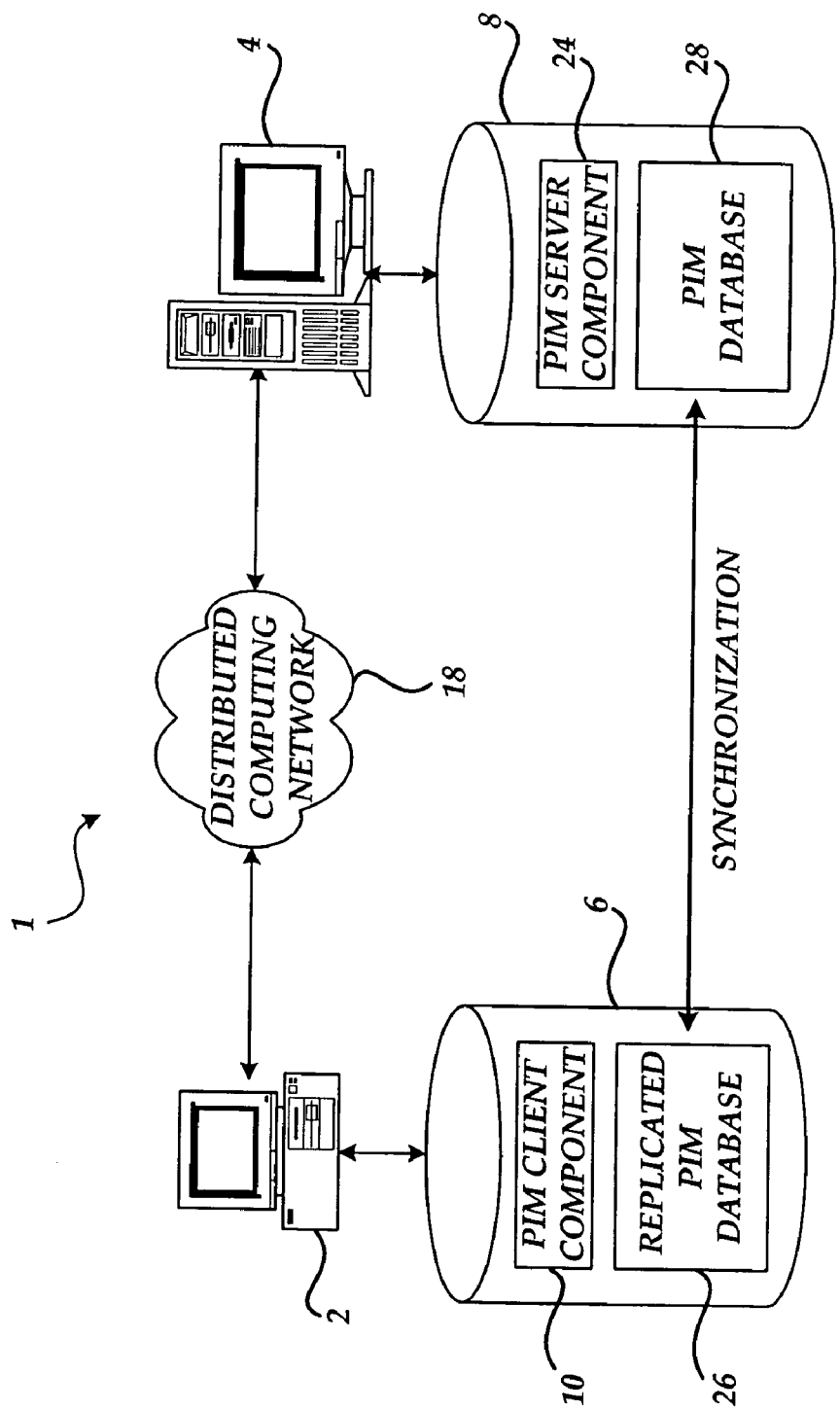
FIG. 1 is a computer system architecture diagram illustrating a computer system utilized in and provided by the various embodiments of the invention.

Referring now to the drawings, in which like numerals represent like elements, a computer hardware and software architecture utilized by a computer system provided in the various embodiments of the invention will be described. In particular, FIGS. 1 and 2 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment 1 for the various embodiments of the invention will be described. As shown in FIG. 1, a client computer 2 is provided that is connected to a distributed computing network 18. According to the various embodiments of the invention, the client computer 2 comprises a standard desktop, laptop, or notebook computer operative to communicate with other computer systems via the network 18. In particular, the client computer 2 is operative to communicate with the server computer 4. The client computer 2 is also operative to store and execute one or more software components including the PIM client component 10. The PIM client component 10 and a replicated PIM database 26 may be stored upon a hard disk drive 6 or other type of storage medium located at client computer 2.

As known to those skilled in the art, the PIM client component 10 is operative to provide the functionality for managing a user's personal information data. For instance, a standard PIM client component 10 is operative to provide functionality for managing a calendar, e-mail messages, contacts, tasks, notes, to do items, and other information. Data stored in each of these categories is saved by the client computer 2 in the replicated PIM database 26.

When the client computer 2 is offline from the network 18 and unable to communicate with the server 4, any changes made to the PIM data are stored in the replicated PIM database 26. When the client computer 2 is again connected to the network 18, the PIM client component 10 is operative to synchronize the contents of the replicated PIM database 26 with the PIM database 28 stored at the server computer 4.

In order to effectuate the synchronization, the server computer 4 is operative to execute a PIM server component 24. The PIM server component 24 and a PIM database 28 for the client computer 2 are stored on a hard disk drive 8 or other type of mass media available to the server computer 4. As will be described in greater detail below, the PIM client component 10 and the PIM server component 24 are operative to communicate with one another. Through this communication, the client component 10 and the server component 24 can synchronize the PIM database 28 with the replicated PIM database 26. As known to those skilled in the art, synchronization of the databases 26 and 28 comprises the process of correlating the records stored in the databases 26 and 28 so that the records contained in each database are identical. As will be described in greater detail below, the PIM client component 10 is also operative to resolve conflicts between records stored in the PIM database 28 and the replicated PIM database 26.

Figure 2:
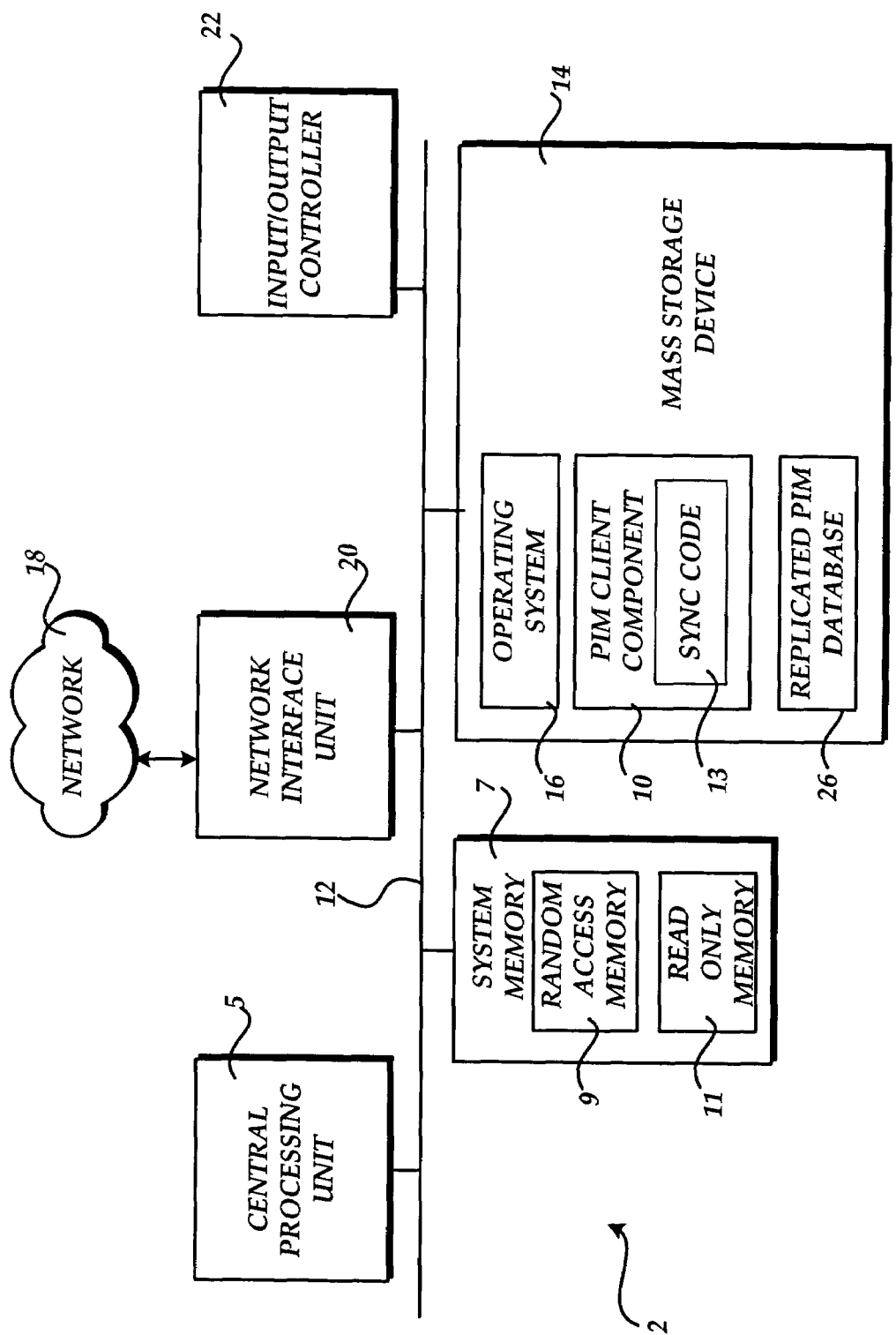
FIG. 2 is a computer architecture diagram showing an illustrative hardware and software architecture for a client computer provided in the various embodiments of the invention.

Turning now to FIG. 2, an illustrative computer architecture for a client computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2 or the server computer 4, described below.

According to various embodiments of the invention, the client computer 2 may operate in a networked environment using logical connections to remote computers, such as the server computer 4, through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a PIM client component 10. As described briefly above, the PIM client component 10 comprises an executable software component operative to provide functionality for managing personal information. For instance, the PIM client component 10 is operative to provide functionality for managing a calendar, contacts, tasks, notes, and other personal information. According to one embodiment of the invention, the PIM client component client 10 comprises the OUTLOOK messaging and PIM application from MICROSOFT CORPORATION of Redmond, Wash. It should be appreciated that embodiments of the invention may be implemented in other types of PIM and e-mail clients from other manufacturers.

As shown in FIG. 2, the PIM client component 10 includes synchronization code 13. The synchronization code 13 is responsible for synchronizing the replicated PIM database 26 with the PIM database 28 stored at the server computer 4. Synchronization of the replicated PIM database 26 typically occurs when records stored in the replicated PIM database 26 are added or modified. Additionally, synchronization may also occur when the client computer 2 has been disconnected from the network 18 and unavailable to connect to the server computer 4 for some period of time. Typically, during the offline period, records are added to the replicated PIM database 26 or are modified by a user of the client computer 2. When the client computer 2 is returned to an online state by connecting the client computer 2 to the network 18, the added and modified records in the replicated database 26 are synchronized with the contents of the PIM database 28. In this manner, the contents of the PIM database 28 and the replicated PIM database 26 are synchronized as often as possible.

It should be appreciated that the server computer 4 may also include all of the conventional components shown in FIG. 2. It should also be appreciated that the server computer 4 is operative to execute a PIM server component 24. As discussed briefly above, the PIM server component 24 is operative to communicate with the PIM client component 10. Through this communication, the PIM server component 24 is operative to transmit e-mail messages and other types of messages to the PIM client component 10. Additionally, the PIM server component 24 is operative to communicate with the PIM client component 10 to synchronize the PIM database 28 and the replicated PIM database 26. According to one embodiment of the invention, the PIM server component 24 comprises the EXCHANGE messaging and collaboration server application from MICROSOFT CORPORATION of Redmond, Wash. It should be appreciated, however, that the PIM server component 24 may comprise other types of messaging and collaboration server components available from other manufacturers.

Figure 3:
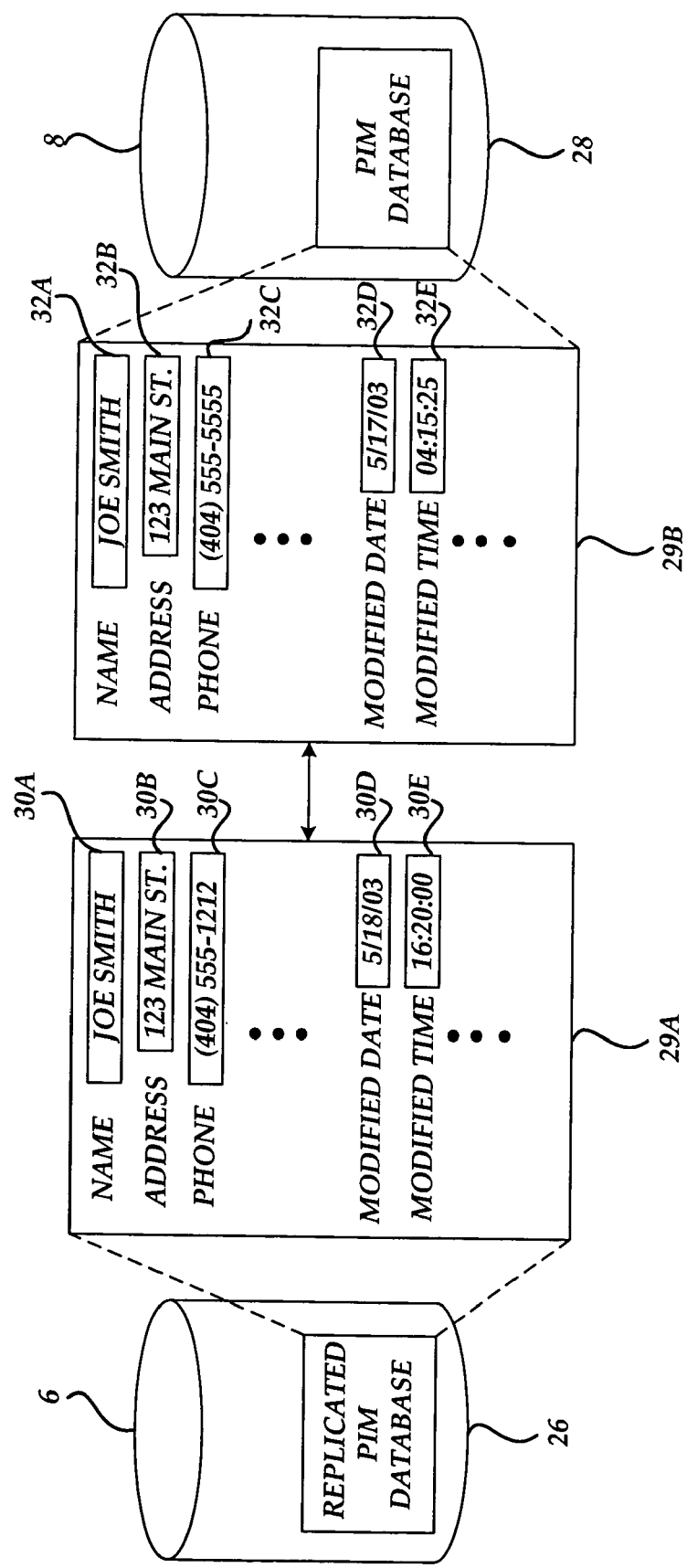
FIG. 3 is a database architecture diagram showing the format and other aspects of database records utilized in the various embodiments of the invention.

Referring now to FIG. 3, additional details regarding the contents of the PIM database 28 and the replicated PIM database 26 will be described. As shown in FIG. 3, the replicated PIM database 26 comprises one or more records 29A. Each of the records 29A include one or more properties 30A-30E. Properties may also be referred to herein as fields. As shown in FIG. 3, each of the properties 30A-30E may include a value. For instance, the property 30A corresponding to a name includes a value set as "Joe Smith." When a user utilizing the PIM client component 10 modifies a record, such as the record 29A, the record modification is reflected in the value corresponding to the edited property.

It should be appreciated that while the record 29A illustrates portions of a contact record, other types of records may be stored by the PIM client component 10 in the replicated PIM database 26. For instance, records may be stored that comprise e-mail messages, calendar appointments and reminders, tasks stored in a to-do list, notes, and other types of data known to those skilled in the art. It should also be appreciated that some of the properties contained a record 29A may be editable by a user while other properties may not editable by a user. For instance, the name property 30A, the address property 30B, and the phone property 30C are properties having values that are editable by a user. However, the modified date property 30D and the modified time property 30E are properties whose values are maintained and modified by the PIM client computer 10.

According to the various embodiments of the invention, the PIM client component 10 is operative to monitor changes to records stored in the replicated PIM database 26. In particular, the PIM client component 10 is operative to monitor and track the modifications to records stored in the replicated PIM database 26 on a per property basis. Therefore, if a user utilizes the PIM client component 10 to modify one of the properties 30A-30E of the record 29A, the PIM client component 10 is operative to store data indicating which of the properties 30A-30E have been modified. As will be described in greater detail below, by tracking the changes made to each of the properties 30A-30E, the PIM client component 10 is operative to resolve conflicts between records stored in the PIM database 28 and the replicated PIM database 26 without user intervention.

As shown in FIG. 3, the PIM database 28 stored at the server computer 4 includes records corresponding to those records stored in the replicated PIM database 26. In particular, as shown in FIG. 3, the PIM database 28 includes record 29B corresponding to the record 29A stored in the replicated PIM database 26. The record 29B includes properties 32A-32E corresponding to the properties 30A-30E on the record 29A. As also shown in FIG. 3, it is possible for the properties of the record 29B to have values different than the values of the corresponding properties of the record 29A. For example, the properties 32D and 32E are different that than the properties 30D and 30E.

Although the values of the properties 32A-32C are identical to the values of the fields 30A-30C, the difference between the values of the properties 32D-32E and the values of properties 30D-30E would cause a synchronization conflict to occur when the PIM database 28 is synchronized with replicated PIM database 26. The synchronization conflict occurs even though all other values of the properties of the records 29A and 29B are identical. As will be discussed in greater detail below, the various embodiments of the invention will prevent a synchronization conflict from occurring in this situation and in others.

The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

Referring now to FIG. 4, an illustrative routine 400 will be described for tracking property level changes made to records contained in the replicated PIM database 26. The routine 400 begins at operation 402, where a request is received to modify properties of a record stored in the replicated PIM database 26. As known to those skilled in the art, such a request is typically received from a user of the client computer 2. For instance, a user of the client computer 2 may request that a calendar record, a task, a note, or other type of data record be modified. Moreover, such a request may be made through other types of actions by a user, such as when a user reads the contents of an e-mail message and thereby modifies a property defining whether or not the e-mail has been read, and possibly modifies properties defining the time the record was last modified.

From operation 402, the routine 400 continues to operation 404, where the requested modification is performed. As discussed above, this may comprise modifying a record in the manner requested by a user or modifying the record in other possible ways as the result of user action. From operation 404, the routine 400 continues to operation 406, where data is stored in the replicated PIM database 26 that indicates that properties on the particular record have been changed. For instance, if a user modified properties of a contact record, such as a contact's name, data would be stored indicating that the name property had been modified. Similarly, data would be stored in the replicated PIM database 26 indicating the modification to any other properties within the record. As will be discussed in greater detail below, the data indicating whether or not properties of a record stored in the replicated PIM database 26 have been modified are utilized by the PIM client component 10 to resolve synchronization conflicts without the need for user participation. From operation 406, the routine 400 continues to operation 408, where it ends.

Referring now to FIG. 5, an illustrative routine 500 will be described illustrating a process for synchronizing records contained in a replicated PIM database 26 with corresponding records stored in the PIM database 28. The routine 500 begins at operation 502, where a request is received to synchronize the replicated PIM database 26 with the PIM database 28. This request may be received manually from a user of the client computer 2 or maybe generated following the connection of the client computer 2 to the network 18.

From operation 502, the routine 500 continues to decision operation 504, where a determination is made as to whether any records in the replicated PIM database 26 are to be uploaded to the PIM database 28 stored at the server computer 4. Records to be uploaded would include new records that have not be previously been transmitted to the PIM database 28 and records previously synchronized between the PIM database 28 and the replicated PIM database 26 that have been modified. If no records are to be uploaded from the client computer 2 to the server computer 4, the routine 500 branches from operation 504 to operation 524, where it ends. If, however, records are to be uploaded from the client computer 2 to the server computer 4, the routine 500 continues from operation 504 to operation 506.

At operation 506, the first record in the replicated PIM database 26 to be uploaded to the PIM database 28 is identified as a current record. The routine 500 then continues to operation 508, where a determination is made as to whether the current record is a new record or an existing record that has been modified. If the current record is a new record, the routine 500 branches from operation 508 to operation 516, where the record is added to an upload queue. The upload queue temporarily contains each of the records that are to be uploaded to the PIM database 28 during the synchronization process. If, however, it is determined at decision operation 508 that the current record is not a new record, the routine 500 continues to operation 510.

At operation 510, a determination is made as to whether the version of the current record stored on the server computer 4 has changed since the last synchronization of the replicated PIM database 26 and the PIM database 28. According to one embodiment of the invention, the PIM client component 10 transmits a request to the PIM server component 24 for data indicating whether or not the version of the record stored in the PIM database 28 has changed. The PIM server component 24 responds to the request with data indicating whether or not the stored record has been modified.

From operation 510, the routine 500 continues to operation 512, where a determination is made as to whether the data received from the PIM server component 24 indicates that the current record has been modified in the PIM database 28. If the record has not been modified, the routine 500 continues from operation 512 to operation 516, where the record is added to the upload queue. If, however, the record stored in the replicated PIM database 26 has been modified, the routine 500 branches from decision operation 512 to operation 514. At operation 514, a conflict resolution process is performed on the record. The conflict resolution process attempts to resolve the conflict between the record in the replicated PIM database 26 and the PIM database 28. Additional details regarding the operation of the conflict resolution process are provided below with respect to FIGS. 6A and 6B.

From operations 514 and 516, the routine 500 continues to decision operation 518, where a determination is made as to whether the last record has been processed. If the last record has not been processed, the routine 500 continues to operation 522, where the next record to be uploaded is identified as a current record. From operation 522, the routine 500 returns back to operation 508, where the above-described process is repeated for the next record. If, however, at decision operation 518, it is determined that the last record has been encountered, the routine 500 branches to operation 520. At operation 520, all of the records identified in the upload queue are transmitted to the PIM server component 24 for storage in the PIM database 28.

It should be appreciated that some of the items in the upload queue may result in a synchronization conflict at the PIM server component 24. In the event of an actual synchronization conflict, a user of the client computer 2 may be requested to select between several records and to choose the correct record. Alternatively, the PIM server component 24 may store the conflicting items in a temporary location for future resolution by a user. From operation 520, the routine 500 continues to operation 524, where it ends.

Figure 6A:
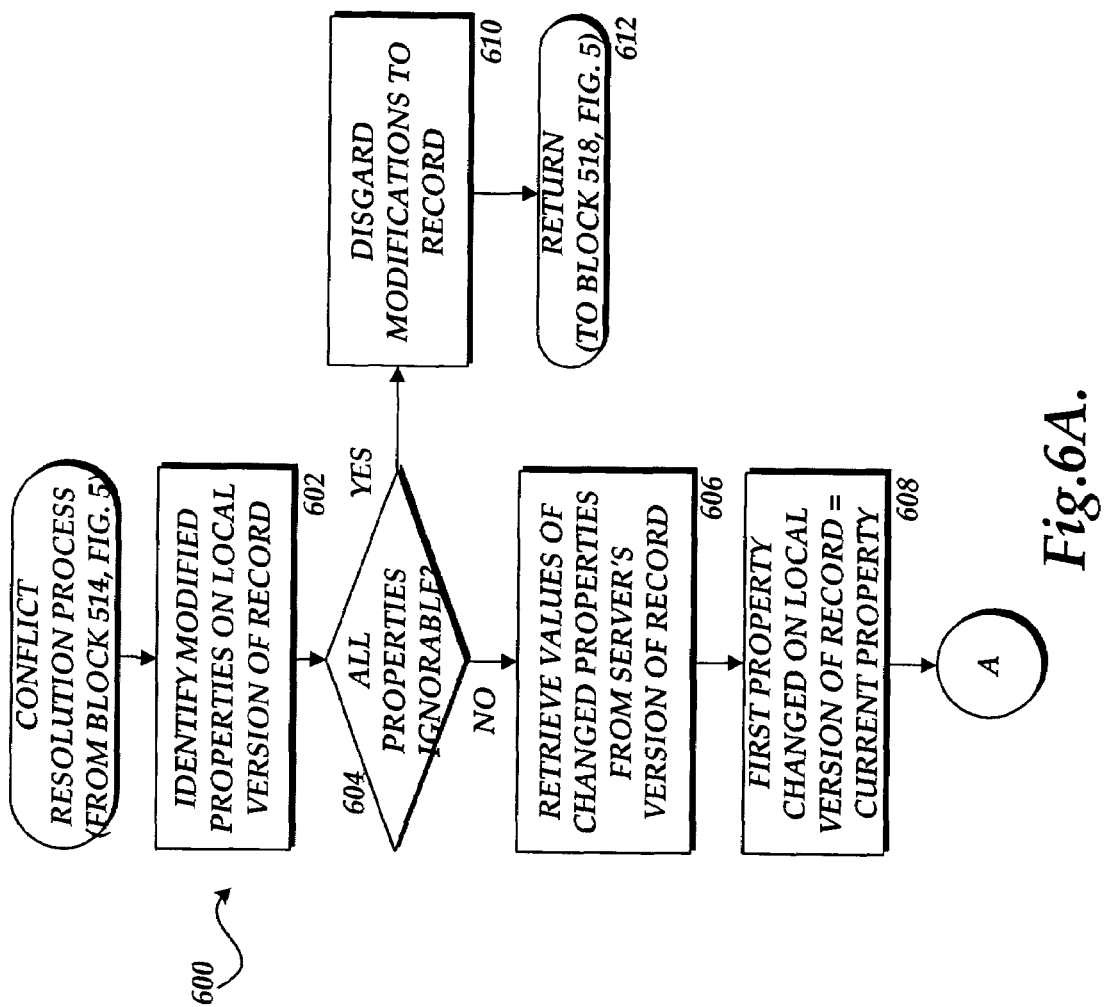
FIGS. 6A-6B are flow diagrams illustrating a conflict resolution process utilized in the various embodiments of the present invention.
Figure 6B:
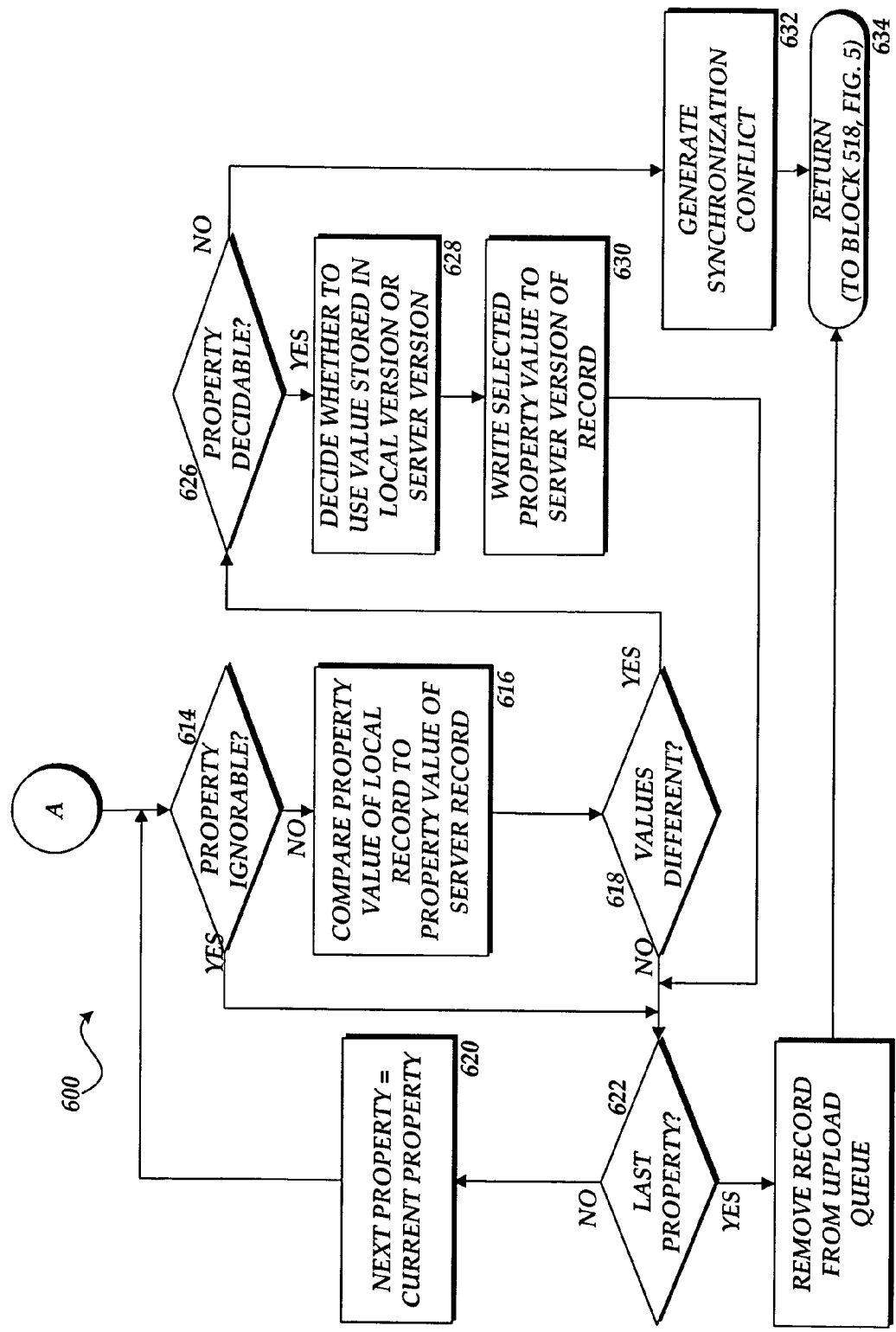

Referring now to FIGS. 6A and 6B, a routine 600 will be described showing an illustrative process for resolving conflicts between records stored in the replicated PIM database 26 and the PIM database 28. It should be appreciated that the process illustrated in FIGS. 6A and 6B is performed on a per record basis. The process shown in FIGS. 6A and 6B is performed in response to a determination at operation 512 that the current record has been modified at the client computer 2 and the server computer 4. This is illustrated in FIG. 5 and described above.

The routine 600 begins at operation 602, where the PIM client component 10 identifies each of the modified properties on the version of the record stored at the replicated PIM database 26. The routine 600 then continues from operation 602 to operation 604, where the PIM client component 10 determines whether each of the modified properties is an ignorable property. As discussed briefly above, ignorable properties are those properties of a record which may safely be ignored during a synchronization process. One example of such a property is the last modified time/date stamp property that is commonly written on records stored in the replicated PIM database 26. Typically, ignorable properties that are properties that are application or protocol specific and not in any way directly editable by a user.

If all of the modified properties are properties that may be ignored during the synchronization process, the routine 600 branches from operation 604 to operation 610. At operation 610, the modifications to the properties of the records stored in the replicated PIM database 26 are discarded. The routine 600 then continues from operation 610 to operation 612, where it returns to operation 518, described above with respect to FIG. 5.

If, at operation 604, the PIM client component 10 determines that all of the modified properties are not ignorable, the routine 600 continues to operation 606. At operation 606, the PIM client component 10 retrieves from the PIM server component 24 the values of each of the changed properties from the version of the record stored in the PIM database 24 by the server computer 4. The routine 600 then transitions to operation 608, where the first property that has been changed on the version of the record stored in the replicated PIM database 26 is identified as a current property.

From operation 608, the routine 600 continues to operation 614, where the PIM client component 10 determines whether the current property is an ignorable property. If the current property is an ignorable property, the routine 600 branches from operation 614 to operation 622 where a determination is made as to whether the current property is the last modified property of the record stored in the replicated PIM database 26. If the current property is the last property, the routine 600 branches from operation 622 to operation 624 where the current record is removed from the upload queue. The routine 600 then continues from operation 624 to operation 634, where it returns to operation 518, described above with respect to FIG. 5.

If, at operation 622, it is determined that the current property is not the last modified property to be processed, the routine 600 branches from operation 622 to operation 620. At operation 620, the next property that has been modified in the replicated PIM database 26 is identified as the current property. The routine 600 then continues from operation 620 back to operation 614, discussed briefly above.

If, at operation 614, a determination is made that the current property is not an ignorable property, the routine 600 transitions from operation 614 to operation 616. At operation 616, the PIM client component 10 compares the value of the modified property contained in the record stored at the replicated PIM database 26 to the value of the property stored in the corresponding record stored in the PIM database 28. The routine 600 then continues to operation 618 where a determination is made as to whether the value stored at the client computer 2 and the server computer 4 are different. If the values are not different, the routine 600 branches from operation 618 to operation 622, described above. If, however, the values are different, the routine 600 branches from decision operation 618 to decision operation 626.

At operation 626, the PIM client component 10 makes a determination as to whether the current property is a decidable property. As discussed briefly above, there is a set of properties on each record stored in the replicated PIM database 26 that can be directly edited by user actions, cannot be considered ignorable, yet can be set by a PIM client component 10 when resolving conflicts. For instance, a property identifying the read state of an e-mail message may be considered decidable. As a result, the PIM client component 10 is free to choose between two conflicting states without the possibility of losing data. Typically, decidable properties are those properties with a limited set of possible values, such as Boolean properties. Moreover, the client component 10 may merge mutually exclusive properties so that no data is lost and no conflict is generated.

If, at operation 626, the PIM client component 10 determines that the current property is not decidable, the routine 600 branches from operation 626 to operation 632. At operation 632, a synchronization conflict is generated by the PIM client component 10 for the current record. The generation of a synchronization conflict may result in a user of the client computer 2 being required to participate in the conflict resolution process. From operation 632, the routine 600 continues to operation 634, where it returns to block 518, described above.

If, at operation 626, the PIM client component 10 determines that the current property is decidable, the routine 600 transitions from operation 626 to operation 628. At operation 628, the PIM client component 10 determines whether the value of the property stored in the record in the replicated PIM database 26 or the value of the property stored in the record in the PIM database 28 should be utilized.

The routine 600 then continues from operation 628 to operation 630, where the selected property value is written to the version of the record stored in the PIM database 28. The property value may be written to the record stored in the PIM database 28 through a request transmitted from the PIM client component 10 to the PIM server component 24. The routine 600 then continues from operation 630 to operation 622 where a determination is made as to whether additional properties of the current record remain to be processed.

Based on the foregoing, it should be appreciated that the various embodiments of the invention provide a method, system, apparatus, and computer-readable medium for synchronizing records with conflict resolution. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for synchronizing a first record stored at a first computer with a corresponding second record stored at a second computer, the first and second records comprising at least one property, the method comprising:

determining, at the first computer, whether at least one of the properties of the first and second records have been modified;

in response to determining that at least one of the properties of the first and second records have been modified, determining whether all of the modified properties of the first record comprise properties that can be ignored during synchronization wherein at least one of the modified properties that can be ignored comprises a last modified time/date stamp property stored in a replicated personal information manager (PIM) database, wherein the properties that can be ignored comprise properties not directly editable by a user and being one of the following:

application and protocol specific, and wherein discarding the at least one of the modified properties of the first record;

for each of the modified properties of the first record that do not comprise properties that can be ignored during synchronization, identifying each of the modified properties of the first record;

for each of the modified properties of the first record that cannot be ignored during synchronization that are identified, determining whether a value of the modified property stored in the first record is different than a value of the modified property stored in the second record:

in response to determining that the value of the modified property stored in the first record is not different than the value of the modified property stored in the second record, discarding the modification to the property of the first record, in response to determining that the value of the modified property stored in the first record is different than the value of the modified property stored in the second record, determining whether the modified property comprises a property that is decidable wherein a decidable property is at least one of the following: can be directly edited by user actions, cannot be considered ignorable, and can be set by a client computer configured to resolve synchronization conflicts without user interaction, wherein one of the following is selected: the value of the modified property stored in the first record, the value of the modified property stored in the second record and a merge of mutually exclusive properties wherein no data is lost and no conflict is generated, and utilizing the selected value of the modified property as the value of the modified property for both the first record and the second record, determining whether the at least one of the properties of the first record does not exist in the second record;

in response to determining whether the at least one property of the first record does not exist in the second record, determining the value of the at least one property of the first record that does not exist in the second record; and storing, in the second record, the at least one property of the first record that does not exist in the second record and the determined value of the at least one property of the first record that does not exist in the second record.

2. The method of claim 1, further comprising:

in response to determining that the modified property comprises a property that is not decidable, generating a synchronization conflict for the first and second records.

3. A computer-readable medium having stored thereon computer-readable instructions which, when executed by a computer, cause the computer to perform the method of claim 1.

4. A computer-controlled apparatus capable of performing the method of claim 1.

5. A method for synchronizing first records stored at a first computer with second records stored at a second computer, each of the first and second records comprising at least one property, the method comprising:

identifying each of the first records having modified properties;

determining, at the first computer, for each of the first records having modified properties whether a corresponding second record has also been modified;

for each of the first records having modified properties and a corresponding second record that has also been modified:

determining whether each of the modified properties are ignorable wherein at least one of the modified properties that can may be ignored comprises a last modified time/date stamp property stored in a replicated personal information manager (PIM) database and wherein ignorable properties comprise properties not directly editable by a user and being one of the following: application and protocol specific, for each of the modified properties that are not ignorable, determining whether a value of the modified property stored in the first record is different than a value of the modified property stored in the second record, in response to determining that the value of the modified property stored in the first record is not different than the value of the modified property stored in the second record, discarding the modification to the property of the first record;

in response to determining that the value of the modified property stored in the first record is different than the value of the modified property stored in the second record, determining whether the modified property comprises a property that is decidable wherein a decidable property is at least one of the following: can be directly edited by user actions, cannot be considered ignorable, and can be set by a client computer configured to resolve synchronization conflicts without user interaction, wherein one of the following is selected: the value of the modified property stored in the first record, the value of the modified property stored in the second record and a merge of mutually exclusive properties wherein no data is lost and no conflict is generated, and utilizing the selected value of the modified property as the value of the modified property for both the first record and the second record, for each of the first records having modified properties, determining whether at least one of the modified properties of each of the first records does not exist in the corresponding second record;

in response to determining whether the at least one of the modified properties of each of the first records does not exist in the corresponding second record, determining the value of the at least one of the modified properties of the first record that does not exist in the corresponding second record; and storing, in the second record, the at least one modified property of each of the first records that does not exist in the corresponding second record and the determined value of the at least one modified property of each of the first records that does not exist in the corresponding second record.

6. The method of claim 5, further comprising:

in response to determining that the modified property comprises a property that is not decidable, generating a synchronization conflict for the first and second records.

7. A computer-readable medium having stored thereon computer-readable instructions which, when executed by a computer, cause the computer to perform the method of claim 5.

8. A computer-controlled apparatus capable of performing the method of claim 5.

9. A method for synchronizing a first record having at least one property and being stored on a first computer with a corresponding second record having at least one corresponding property and being stored on a second computer, the method comprising:

receiving a request to synchronize the first record with the second record;

in response to the request, identifying, at the first computer, at least one changed property of the first record as a set of modified properties;

determining whether a value stored in each of the properties identified in the set of modified properties is identical to a value stored in a corresponding property of the second record;

in response to determining that the values stored in the properties identified in the set of modified properties are identical to values stored in corresponding properties of the second record, discarding the changes to the modified properties of the first record;

determining whether all of the properties identified in the set of modified properties can be ignored during synchronization;

in response to determining that each of the properties in the set of modified properties comprise properties that can be ignored during synchronization, discarding the modifications to the properties of the first record wherein at least one of the modified properties that can be ignored comprises a last modified time/date stamp property stored in a replicated personal information manager (PIM) database and wherein the properties that can be ignored comprise properties not directly editable by a user and being one of the following: application and protocol specific;

in response to determining that each of the modified properties of the first record do not comprise properties that can be ignored during synchronization, identifying each of the modified properties of the first record;

for each of the modified properties of the first record that cannot be ignored during synchronization, determining whether the value of the modified property stored in the first record is different than the value of the modified
property stored in the second record:
  in response to determining that the value of the modified
  property stored in the first record is not different than
  the value of the modified property stored in the second
  record, discarding the modification to the property of
  the first record,
  in response to determining that the value of the modified
  property stored in the first record is different than the
  value of the modified property stored in the second
  record, determining whether the modified property
  comprises a property that is decidable wherein a
  decidable property is at least one of the following: can
  be directly edited by user actions, cannot be considered ignorable, can be set by a client computer configured to resolve synchronization conflicts without
  user interaction, wherein one of the following is
  selected: the value of the modified property stored in
  the first record, the value of the modified property
  stored in the second record and a merge of mutually
  exclusive properties wherein no data is lost and no
  conflict is generated, and
  utilizing the selected value of the modified property as
  the value of the modified property for both the first
  record and the second record,
determining whether at least one of the properties of the
  first record does not exist in the second record;
in response to determining whether the at least one property of the first record does not exist in the second record,
  determining the value stored in the at least one property
  of the first record that does not exist in the second record;
  and
storing, in the second record, the at least one property of the
  first record that does not exist in the second record and
  the determined value of the at least one property of the
  first record that does not exist in the second record.

10. A computer-readable medium having stored thereon computer-readable instructions which, when executed by a computer, cause the computer to perform the method of claim 9.

11. A computer-controlled apparatus capable of performing the method of claim 9.

12. A method for synchronizing a first record stored at a first computer with a corresponding second record stored at a second computer, the first and second records comprising at least one property, the method comprising:
  determining, at the first computer, whether at least one of
    the properties of the first and second records have been
    modified;
  in response to determining that at least one of the properties
    of the first and second records have been modified, determining whether all of the modified properties of the first
    record comprise properties that can be ignored during
    synchronization wherein at least one of the modified
    properties that can be ignored comprises a last modified
    time/date stamp property stored in a replicated personal
    information manager (PIM) database and wherein the
  properties that can be ignored comprise properties not
  directly editable by a user and being one of the following: application and protocol specific, and wherein discarding the at least one of the modified properties of the
  first record;
  in response to determining that all of the modified properties of the first record do not comprise properties that can
    be ignored during synchronization, identifying each of
    the modified properties of the first record that comprise
    properties that cannot be ignored during synchronization;
  for each of the modified properties of the first record that
    cannot be ignored during synchronization:
    determine whether a t-he value of the modified property
      stored in the first record is different than a t-he value of
      the modified property stored in the second record, and
    in response to determining that the value of the modified
      property stored in the first record is not different than
      the value of the modified property stored in the second
      record, discarding the modification to the property of
      the first record;
    in response to determining that the value of the modified
      property stored in the first record is different than the
      value of the modified property stored in the second
      record, determining whether the modified property
      comprises a property that is decidable wherein a
      decidable property is at least one of the following: can
      be directly edited by user actions, cannot be considered ignorable, can be set by a client computer configured to resolve synchronization conflicts without
      user interaction, wherein one of the following is
      selected: the value of the modified property stored in
      the first record, the value of the modified property
      stored in the second record and a merge of mutually
      exclusive properties wherein no data is lost and no
      conflict is generated, and
    utilizing the selected value of the modified property as
      the value of the modified property for both the first
      record and the second record,
    for each of the properties of the first record, determine
      whether the property of the first records does not exist
      in the second record;
    in response to determining whether the property of the
      first record does not exist in the second record, determine the value of the property of the first record that
      does not exist in the second record; and
    store, in the second record, the property of the first
      record that does not exist in the second record and the
      determined value of the property of the first record
      that does not exist in the second record.

13. A computer-readable medium having stored thereon computer-readable instructions which, when executed by a computer, cause the computer to perform the method of claim 12.

14. A computer-controlled apparatus capable of performing the method of claim 12.

* * * * *